United States Patent [19]
Damisch

[11] Patent Number: 5,809,439
[45] Date of Patent: Sep. 15, 1998

[54] TRIGGERING DEVICE FOR A VEHICLE SAFETY SYSTEM WITH AN ACCELERATION SENSOR

[75] Inventor: Jürgen Damisch, Eching-Otterburg, Germany

[73] Assignee: Autoliv Development AB, Vargada, Sweden

[21] Appl. No.: 501,552

[22] Filed: Jul. 12, 1995

[30] Foreign Application Priority Data

Jul. 12, 1994 [DE] Germany ............................ 44 24 551.3

[51] Int. Cl.⁶ ..................................... B60R 21/32
[52] U.S. Cl. ............................. 701/45; 701/46; 180/282; 280/735; 307/10.1
[58] Field of Search .................... 364/424.055, 424.056; 180/268, 271, 282; 280/727, 728.1, 734, 735; 307/10.1

[56] References Cited

U.S. PATENT DOCUMENTS

| | | | |
|---|---|---|---|
| 4,497,025 | 1/1985 | Hannoyer | 364/424.055 |
| 4,984,651 | 1/1991 | Grosch et al. | 180/268 |
| 5,036,467 | 7/1991 | Blackburn et al. | 364/404.057 |
| 5,065,322 | 11/1991 | Mazur et al. | 364/424.057 |
| 5,339,242 | 8/1994 | Reid et al. | 364/424.055 |
| 5,394,326 | 2/1995 | Liu | 364/424.056 |
| 5,424,583 | 6/1995 | Spies et al. | 307/10.1 |
| 5,430,649 | 7/1995 | Cashler et al. | 364/424.056 |
| 5,538,099 | 7/1996 | Blackburn et al. | 180/282 |

*Primary Examiner*—Kevin J. Teska
*Assistant Examiner*—Tyrone V. Walker
*Attorney, Agent, or Firm*—Ostrolenk, Faber, Gerb & Soffen, LLP

[57] ABSTRACT

A triggering device for a vehicle safety device is provided with an acceleration sensor generating signals corresponding to a measured acceleration and a circuit processing the signals for generating a triggering signal when a predetermined threshold value for a vehicle collision is exceeded. To manufacture a triggering device of high security and reliability in an economical manner, the acceleration signals measured by the acceleration sensor are supplied to a threshold circuit having at least two threshold values for a specific vehicle. The threshold circuit activates a counter with a weighting factor that is increased from the first threshold value to the next threshold value. The counter adds received clock pulses to the given weighting factor and at each clock pulse is decremented by a count the weighting factor of which is below that of the first threshold value. The count of the counter is compared with a triggering threshold value, and when said triggering threshold value is reached, the triggering signal is produced. The counter is reset when the count of the counter becomes negative.

18 Claims, 16 Drawing Sheets

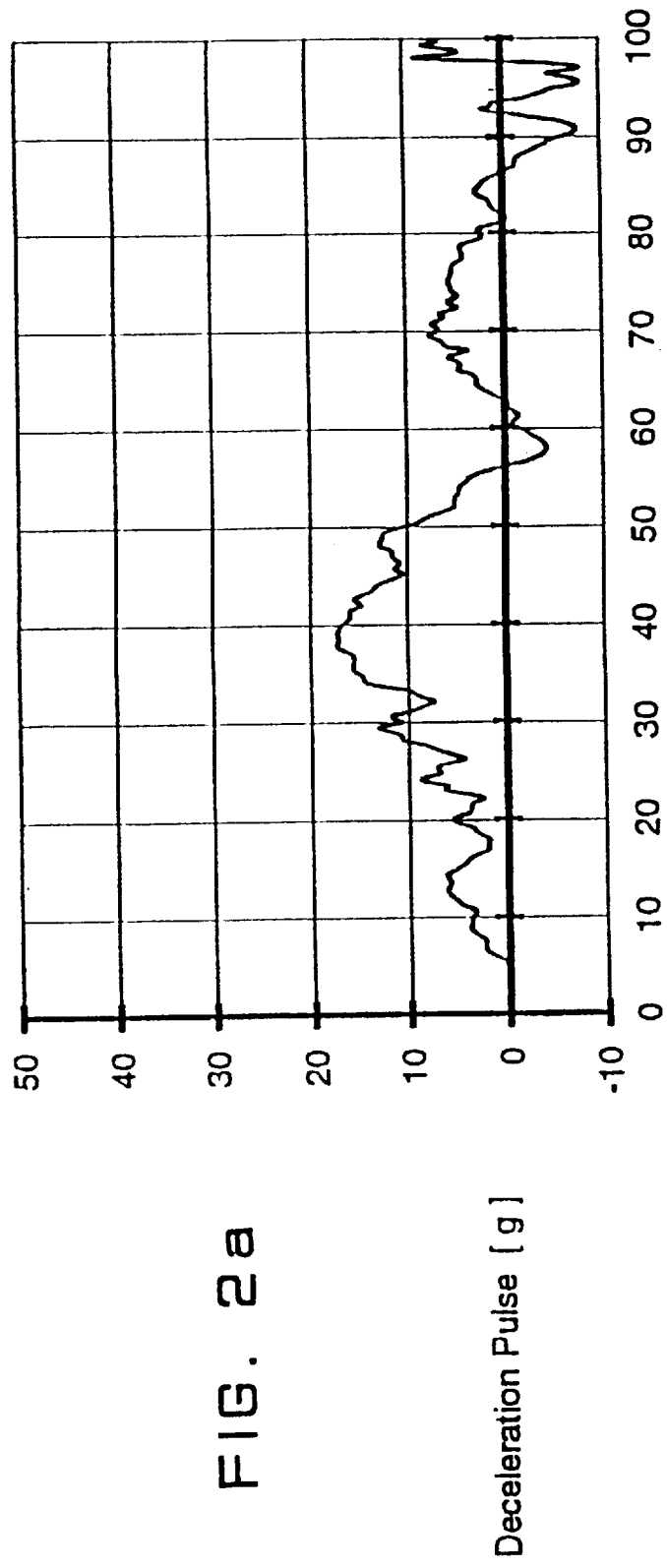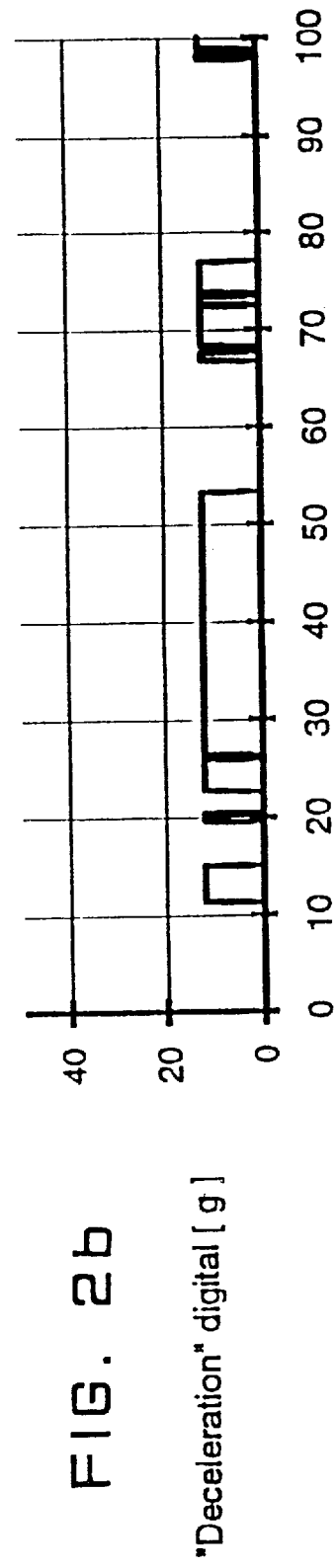
FIG. 2a  Deceleration Pulse [g]
FIG. 2b  "Deceleration" digital [g]

"Delta velocity" digital [ m/s ]

Delta velocity analog [ m/s ]

Difference digital - analog

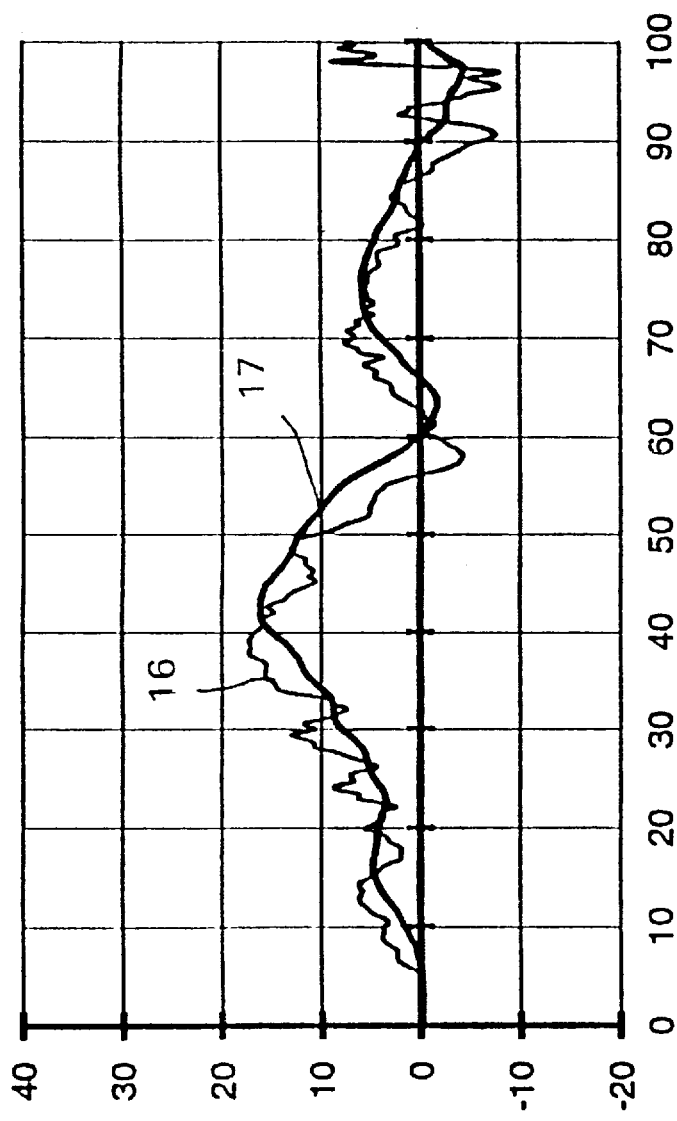
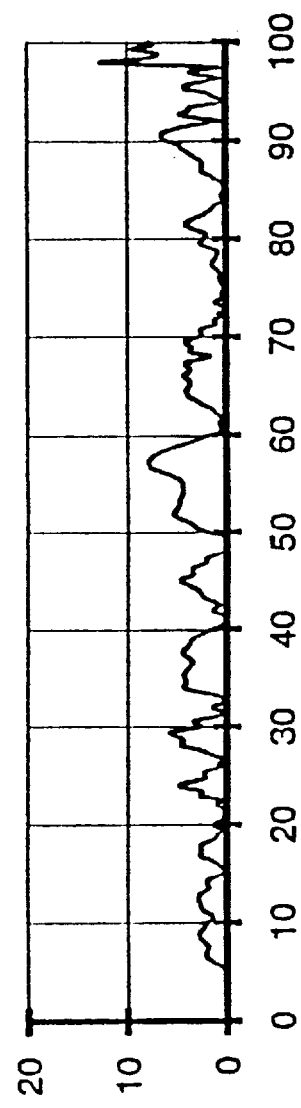
FIG. 3a
Deceleration Pulse [ g ]
unfiltered and filtered
FIG. 3b
"Wavity" [ g ]
(Absolute Difference)

"Wavity" digitalized

Digital "Wavity delta vel"

Analog "Wavity delta vel"

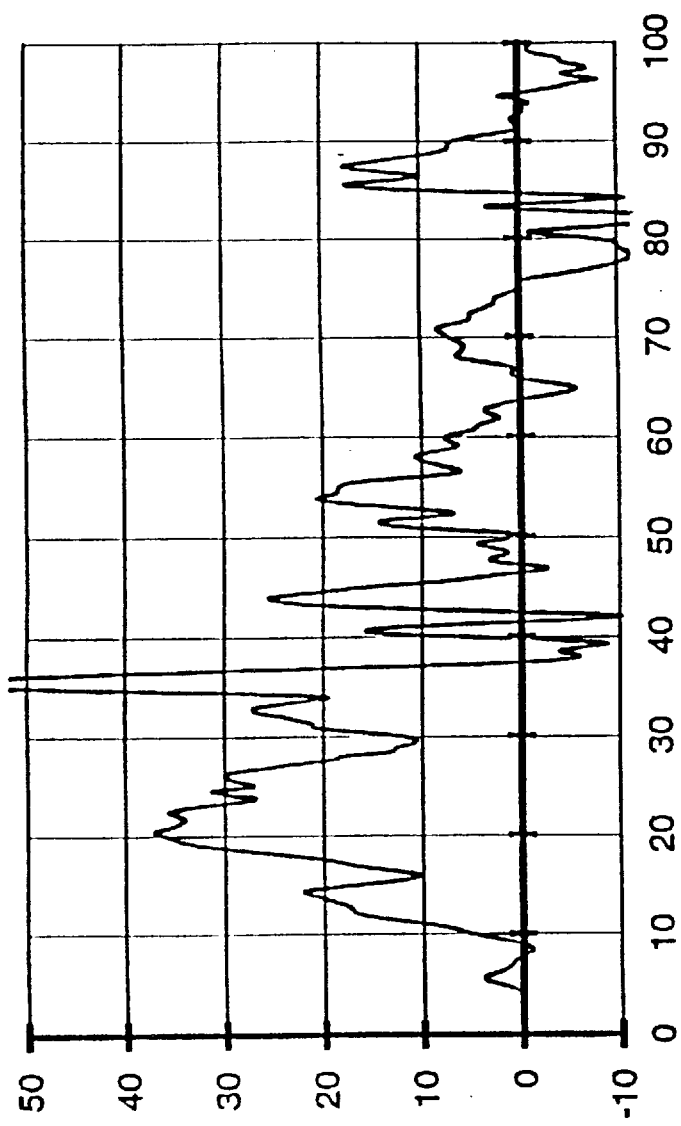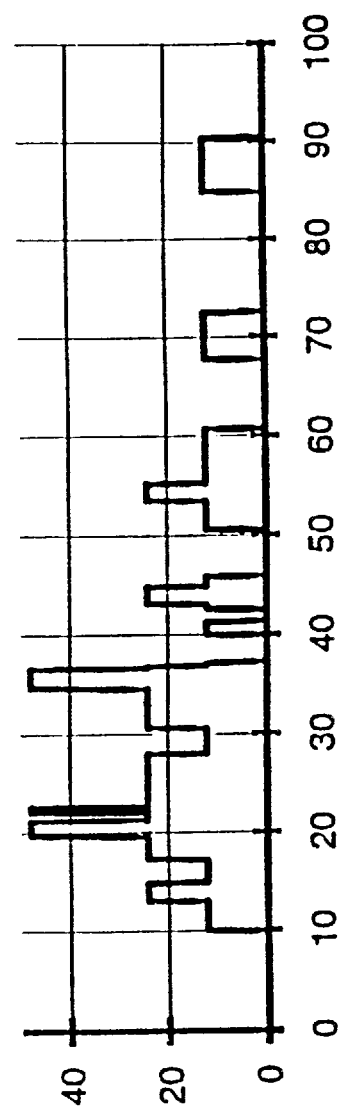
FIG. 4a
Deceleration Pulse [g]
FIG. 4b
"Deceleration" digital [g]

"Delta velocity" digital [ m/s ]

Delta velocity analog [ m/s ]

Difference digital - analog

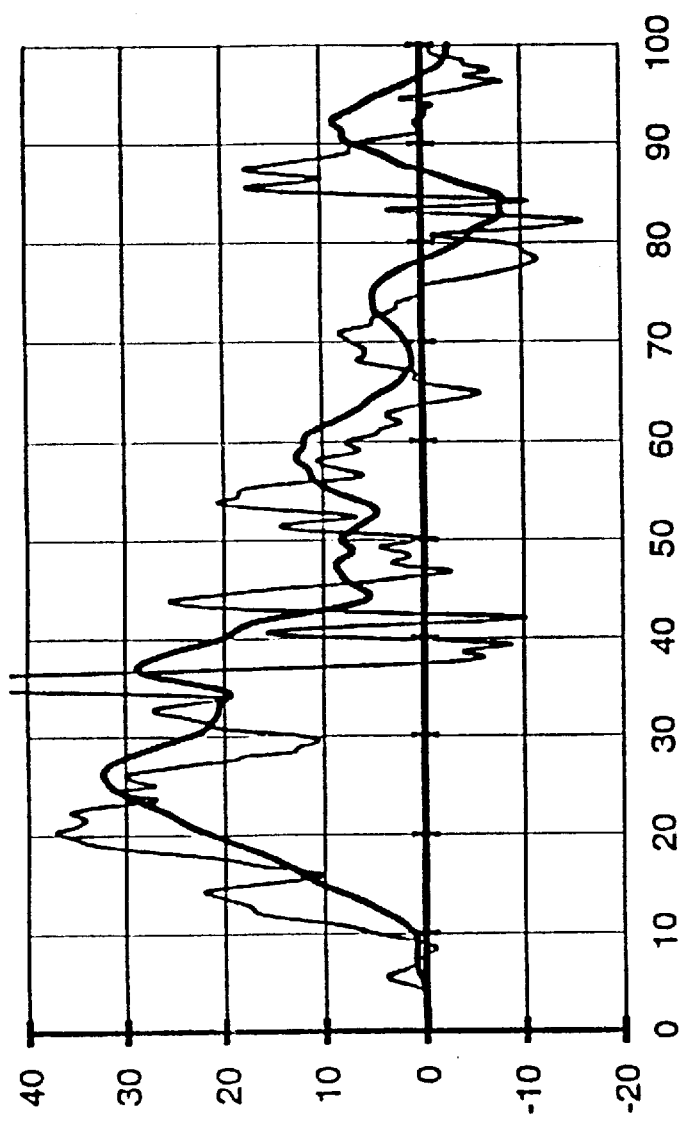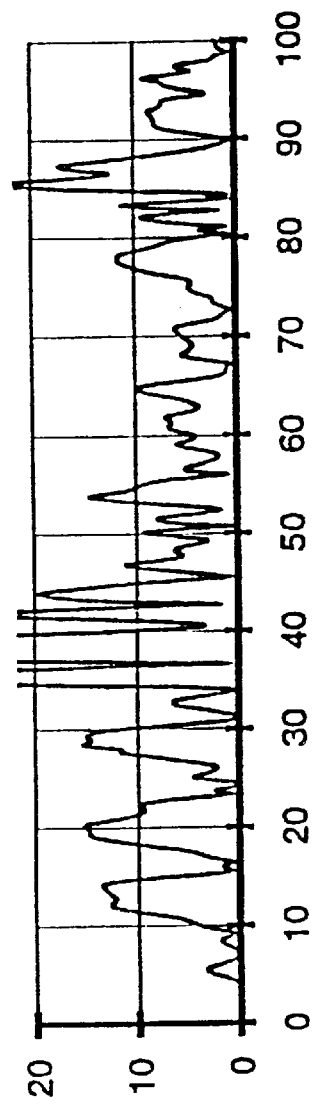
FIG. 5a Deceleration Pulse [g] unfiltered and filtered
FIG. 5b "Wavity" [g] (Absolute Difference)

"Wavity" digitalized

Digital "Wavity delta vel"

Analog "Wavity delta vel"

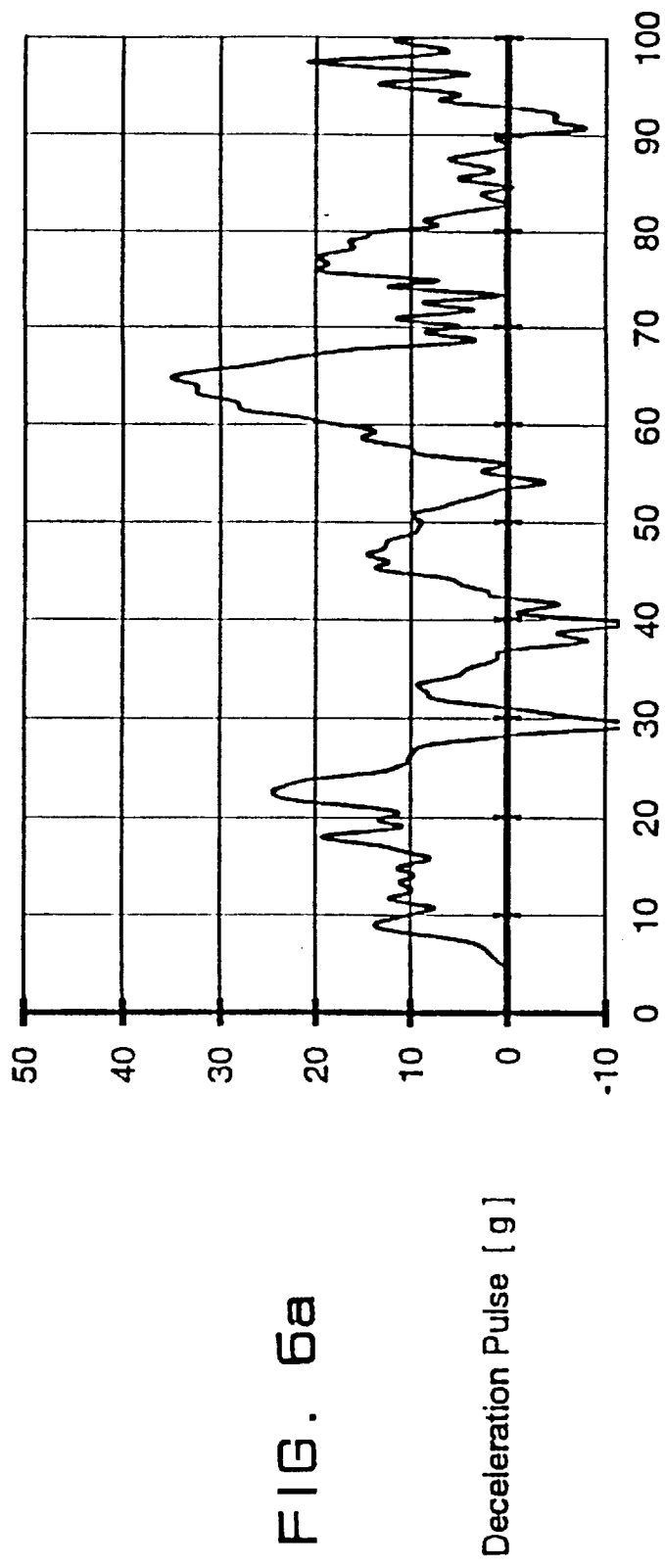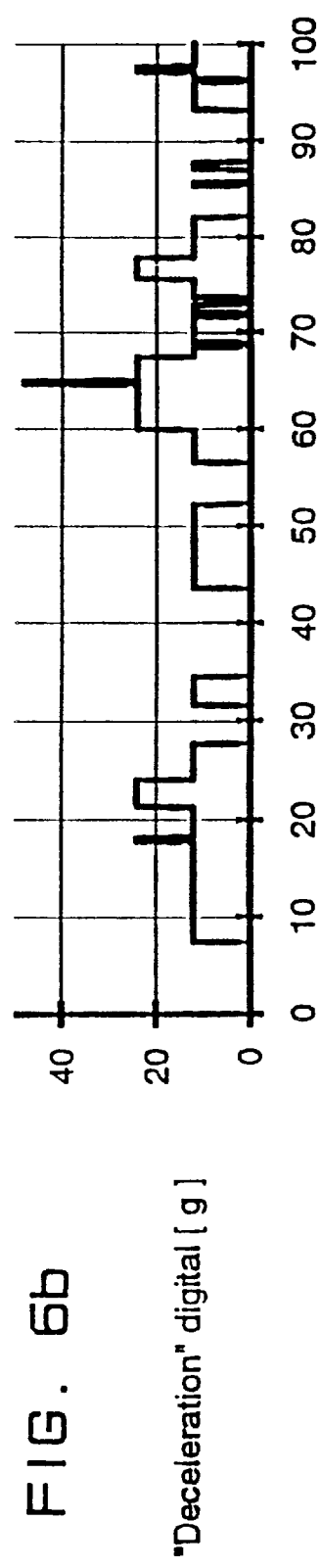
FIG. 6a  Deceleration Pulse [ g ]
FIG. 6b  "Deceleration" digital [ g ]

"Delta velocity" digital [ m/s ]

Delta velocity analog [ m/s ]

Difference digital - analog

Deceleration Pulse [ g ]
unfiltered and filtered

"Wavity" [ g ]
(Absolute Difference)

"Wavity" digitalized

Digital "Wavity delta vel"

Analog "Wavity delta vel"

TRIGGERING DEVICE FOR A VEHICLE SAFETY SYSTEM WITH AN ACCELERATION SENSOR

BACKGROUND OF THE INVENTION

The present invention relates to a triggering device for a vehicle safety system including an acceleration sensor for producing signals representing a measured speed and a circuit for processing the signals and for producing a triggering signal when predetermined threshold values are exceeded.

Triggering devices of this type have been proposed in various different forms. In many of these conventional triggering devices, the magnitude of the reduction in speed, $\delta v$, is selected as a triggering criterion. When a vehicle-specific threshold value of speed reduction $\delta v$ is exceeded, a vehicle safety system, such as an air bag or a belt pretensioner, is activated. The speed reduction may be expressed in m/s within periods in the microsecond range. The value of the speed reduction is obtained by integration of the acceleration detected by the acceleration sensor.

Such known triggering devices are comparatively complex in their structure, since they comprise customized transducers, integrators and microcomputers or logic circuitry.

SUMMARY OF THE INVENTION

One object of the invention is to overcome the disadvantages of the conventional devices and provide a triggering device for a vehicle safety system which may be manufactured in an economic manner while ensuring a high degree of reliability.

In accordance with a preferred embodiment of the invention, a triggering device receives acceleration signals produced by an acceleration sensor and then supplies the acceleration signals to a threshold value circuit having at least two vehicle-specific threshold values. The threshold value circuit activates a counter having a weighting factor (multiplication factor) which increases from the first threshold value to the next threshold value. The counter counts clock pulses multiplied by the given weighting factor. The counter is decremented at each clock pulse by a number corresponding to a weighting factor that is less than the weighting factor of the first threshold value. The resulting count is compared with a triggering threshold value, and when such triggering threshold value is reached, a triggering signal is produced. The counter is reset when the count is negative.

The triggering device in accordance with the preferred embodiment of the present invention achieves pseudo-analogous vehicle collision detection, since the acceleration signals received by a transducer are processed without any specially high degree of accuracy in the analog/digital conversion process. The threshold value circuit includes a comparator having the predetermined individual threshold values stored therein. When the respective threshold value signals are produced, a counter is activated. The counter then counts these clock pulses supplied by a timer circuit, multiplied by a weighting factor equal to the respective threshold value. Because of this type of digitalization and counting, an operation is performed which is comparable with integration. Once the counting operation reaches a predetermined, vehicle-specific threshold value, a triggering signal is produced. By suitable setting of the triggering threshold value, it is possible to eliminate transient acceleration peaks or changes in acceleration which should not trigger the vehicle safety system.

Because of the constant decrementing of the counter in counting steps where the weighting factor is less that the first threshold value, the counter is reset despite the occurrence of minor events that are incapable of exceeding a triggering threshold in the predetermined amount of time.

A vehicle can be subject to negative and positive acceleration of different types not resulting from a collision or an accident. Other types of acceleration or deceleration is caused, for example, by blows or jerks produced when a seat or the steering wheel is adjusted. Such acceleration, not caused by accidents, should not be permitted to trigger the vehicle safety system. However, such acceleration or deceleration may possess a substantial magnitude, although the acceleration or deceleration may occur during a time period which is so short that it can be considered to be irrelevant. Consequently, the triggering device must distinguish between a speed change due to an accident and speed changes which are due to other harmless causes.

The German patent publication 4,207,153 C2 discloses a triggering device which prevents triggering of a vehicle safety system when the deceleration is not caused by collision of a vehicle. The evaluation operation leading to triggering is started with a check time interval, which is followed by a triggering time interval. The evaluation operation is discontinued if the integral derived from the acceleration exceeds predetermined values within the check time interval. This known triggering device operates based on the recognition that a harmless or innocent pulse due to a blow or jerk decays substantially more rapidly than a pulse due to a vehicle collision. Thus, the acceleration signal or values derived from the harmless pulse can be suppressed if the acceleration signal increases more rapidly than would be typical for a vehicle collision.

In contrast to the above described invention, it is preferred in the present invention if, after activation of the counter, the triggering value is reduced after the lapse of a certain amount of time that does not correspond to a time period for a vehicle collision. Such reduction of the triggering value takes into account the fact that a relatively high acceleration acting for a long time period is typical for a collision and must lead to triggering of the safety system. It is also preferred that the system possesses three vehicle-specific comparator threshold values and three triggering values.

An advantage is achieved by increasing or doubling the count steps from one comparator threshold value to the next. In a preferred embodiment, the counter is decremented on each count cycle by half the count step of the first threshold value.

In accordance with the above-described preferred embodiment of the present invention, the triggering criterion is selected to be the magnitude of the speed reduction, $\delta v$. In order to prevent spurious triggering with a high degree of reliability and safety, an apparatus according to another preferred embodiment may include an auxiliary or additional triggering device. The auxiliary triggering device may be used independently or in combination with the triggering device of the first preferred embodiment. In accordance with this additional triggering device, a second acceleration sensor having a damping property is provided. A signal output by the second acceleration sensor is a damped signal. The difference between the signal output by the first acceleration sensor which is essentially undamped and the damped signal output by the second acceleration sensor is computed as a difference signal. The difference signal is supplied to a threshold value circuit. When a predetermined vehicle-specific threshold value is reached, the threshold value circuit activates a counter, which counts the supplied pulses multiplied by a predetermined weighting factor. At each clock pulse, the counter is decremented by a number corresponding to a relatively low weighting factor and the count is compared with a triggering threshold value until a triggering signal is produced. The counter is then reset when the count is negative.

This additional triggering device evaluates the waviness or wavity of the acceleration level over time. If the waviness is high, this will be a criterion for a sufficiently heavy crash, which then must lead to triggering of the vehicle safety system.

Decrementing of the counter is preferably performed in counter steps. The decrementing counter steps preferably have a period equal to half the period of upward counting steps.

In order to enhance reliability to ensure that the triggering device is only operated when there is a sufficiently heavy crash, triggering is preferably limited to cases in which both triggering values are exceeded.

In accordance with a particularly advantageous embodiment of the present invention, a further acceleration sensor is provided for outputting signals to activate a counter when a predetermined threshold value is exceeded. The counter counts the clock pulses supplied thereto multiplied by a predetermined weighting factor. At each clock pulse, the counter is decremented by a number corresponding to a weighting factor that is below that corresponding to the threshold value. The count is compared with a triggering threshold value until a triggering signal is produced. The counter is then reset when the count is negative. This further triggering device produces a safety triggering signal by which the reliability and safety of triggering is increased in the case of a collision. In order to achieve such high reliability, an embodiment may be configured such that triggering only takes place when all three triggering threshold values are exceeded.

The further acceleration sensor may include the second acceleration sensor having a damping property. The damping of the second acceleration sensor may be effected mechanically. The damped acceleration signals may, however, also be derived via a low pass filter from the first acceleration sensor or by other suitable means. Consequently, it is possible to derive the different signals from a single acceleration sensor. In order to increase the safety and reliability of the triggering device, it is preferable to provide at least two acceleration sensors, which may include known transducers or other suitable acceleration sensing devices.

The triggering device in accordance with a preferred embodiment of the present invention has a particularly simple structure including sensors, comparators, counters and decoders. Furthermore, in accordance with the invention, an evaluation of the waviness or wavity of the acceleration signal is used as a triggering criterion or additional triggering criterion. The waviness is produced by a comparison of unfiltered and filtered or damped acceleration signals.

Other features and advantages of the present invention will become apparent from the following description of the invention which refers to the accompanying drawings.

BRIEF DESCRIPTION OF THE DRAWINGS

FIGS. 2a–2e each show a graph of the measured acceleration values for a collision of a vehicle against a rigid obstacle at 12 km/h.

FIGS. 3a–3e show the waviness or wavity of the measured acceleration values in the case of a collision of a vehicle at 12 km/h.

FIGS. 4a–4e and 5a–5e are graphs corresponding to FIGS. 2 and 3 in the case of a collision of a vehicle against a rigid obstacle at 25 km/h.

FIGS. 6a–6e and 7a–7e are graphs corresponding to FIGS. 2 and 3 in the case of a collision of a vehicle against another vehicle at 50 km/h.

DETAILED DESCRIPTION OF PREFERRED EMBODIMENTS

Figure 1:
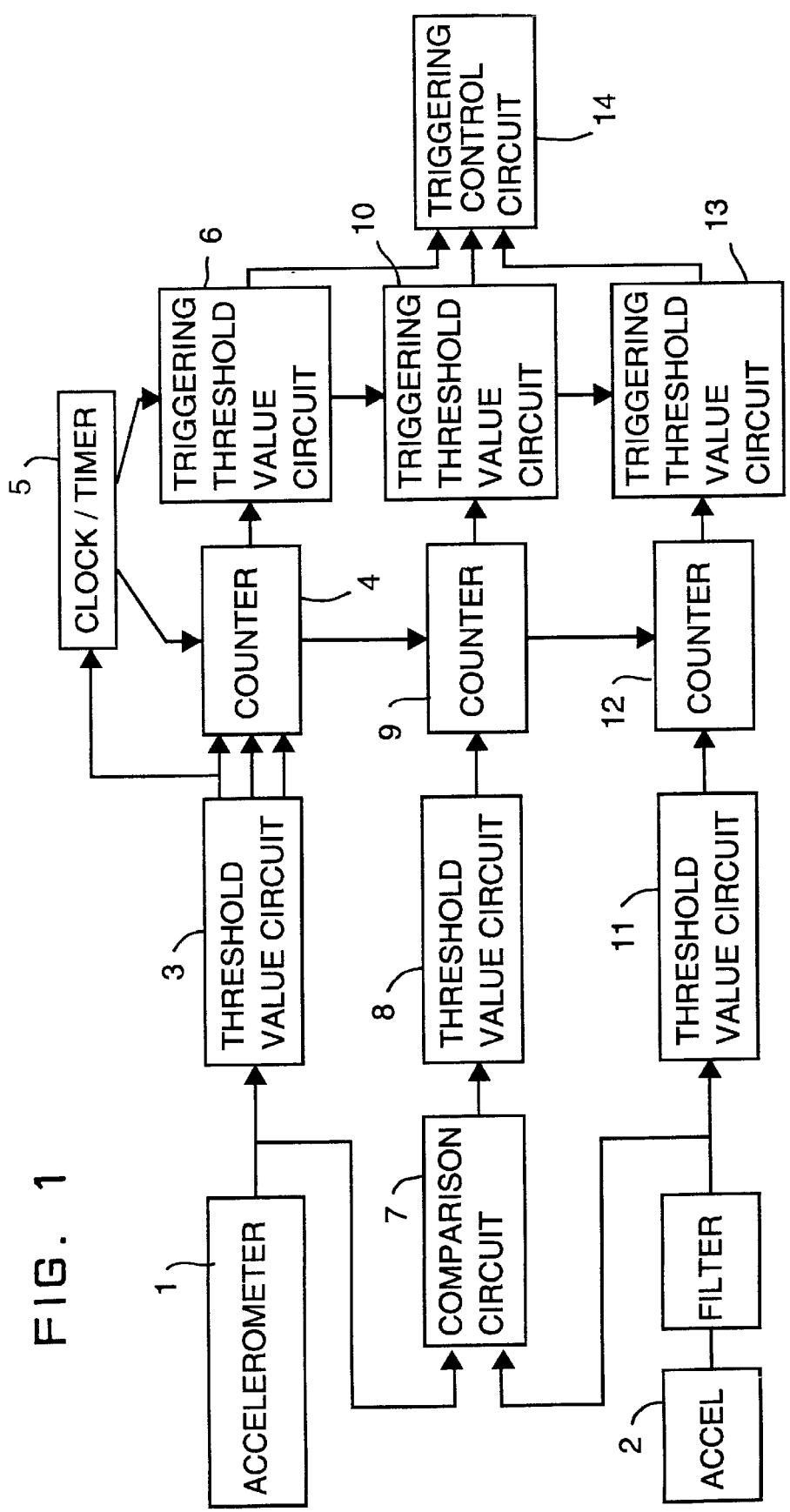
FIG. 1 shows a block circuit diagram of the triggering device.

As seen in FIG. 1, a preferred embodiment of the triggering device includes two acceleration sensors or accelerometers 1 and 2, which may comprise conventional transducers or other suitable acceleration sensing devices. The acceleration sensor 2 may be provided with a mechanical damping device or other filter.

The acceleration values produced by the acceleration sensor 1 are supplied to a threshold value circuit 3 which includes three comparators, one for each threshold level. The threshold value circuit monitors the level of the measured acceleration signals and controls the operation of counter 4 as a function of the level of the measured acceleration signals.

The counter 4 counts clock signals applied to it by the timer circuit 5. For each such clock signal, the counter 4 will be incremented by an amount (a weighting factor) determined by the level of the measured acceleration signal. The counter 4 will be incremented by a value A for each clock pulse generated by timer circuit 5 as long as the measured acceleration signal is below the first threshold value of threshold value circuit 3, will be incremented by a value B for each clock pulse generated by timer circuit 5 when the measured acceleration signal is at or above the first threshold value but below the second threshold value of threshold value circuit 3, will be incremented by a value C for each clock pulse generated by timer circuit 5 when the measured acceleration signal is at or above the second threshold value of threshold value circuit 3 but below the third threshold value thereof, and will be incremented by a fourth value D for each clock pulse generated by timer circuit 5 whenever the measured acceleration signal is above the third threshold level of threshold value circuit 3, A<B<C<D. At the same time, the counter 4 will be decremented by a value less than the value B for each clock pulse generated by the timer circuit 5.

By way of example, the counter 4 may be incremented by 0 for each clock pulse generated by the timer circuit 5 as long the measured acceleration value is less than the first threshold level, may be incremented by 2 for each clock pulse as long as the measured acceleration value is greater than or equal to the first threshold value but is less than the second threshold value, may be incremented by 4 for each clock pulse as long as the measured acceleration value is greater than or equal to the second threshold value but is less than the third threshold value and may be incremented by 8 for each clock pulse as long as the measure acceleration value is greater than or equal to the third threshold value. Simultaneously, the counter would be decremented by 1 for each clock pulse received from timer circuit 5.

The output signal of the counter 4 is supplied to a triggering threshold value circuit 6 which includes a decoder and which produces a triggering signal when the count reaches the threshold value.

The triggering threshold value circuit 6 is controlled by the timer circuit 5 in such a manner that after the lapse of a time T1 that is typical for a given vehicle, the triggering threshold value is, for example, switched to a lower threshold value. After the lapse of a time T2 typical for a collision, the triggering threshold value is changed again.

The signals produced by the acceleration sensors 1 and 2 are compared in a comparison circuit 7. Since the acceleration sensor 1 essentially produces undamped signals and the acceleration sensor 2 produces damped signals, the comparison circuit 7 will produce a waviness pattern rendering possible the classification of the collision in accordance with its type and impetus. The higher the amplitude of the waviness signal, the higher the value to be assumed for the impact energy. The determined waviness values are supplied to a threshold value circuit 8 including a comparator.

Upon reaching a vehicle-specific value, the threshold value circuit 8 activates a decrementing counter 9, which counts each count pulse from the timer circuit 5 with a certain weighting factor and is simultaneously decremented with a number having a lower weighting factor. The count of the counter 9 is supplied to a triggering threshold value encode circuit 10, which produces a triggering signal when a critical threshold value is reached.

In a particularly simple possible form of the invention, the existence of a positive count will suffice for the activation of the safety system so that there is no comparison with threshold values switched over during the predetermined time period.

For the production of the waviness signals, the undamped acceleration sensor 1 is suitable for unfiltered acceleration signals, i.e. acceleration signals having a band width of up to approximately 400 Hz, whereas the damped acceleration sensor 2 is suitable for acceleration signals having a band width of approximately 100 Hz. After activation of the counter 9 resulting from the comparator threshold value being exceeded, a triggering signal is produced if the count of the counter 9 exceeds a triggering threshold value.

The mechanically damped acceleration sensor 2 produces acceleration signals which are supplied to a threshold value circuit 11 which includes a comparison circuit. As soon as a predetermined vehicle-specific threshold value is exceeded, the comparison circuit 11 will activate the counter 12, which will count the counter pulses of the timer circuit 5 upward with a predetermined weighting factor and simultaneously will be decremented on each count pulse by a number with a lesser weighting factor. If the count reaches a critical threshold value as set by a triggering threshold value circuit 13 which includes a decoder, a triggering signal is produced. In a particularly simple form of the invention, the presence of a positive count is sufficient for activation of the safety system, i.e. there is then no comparison with switched threshold values varying over time.

The three signals arriving from the triggering threshold value circuits 6, 10 and 13 are supplied to an AND gate of a triggering control circuit 14, which produces a triggering signal if all three triggering threshold values are reached.

FIGS. 2 through 10 indicate the acceleration signals obtained and processed.

Figure 2C:
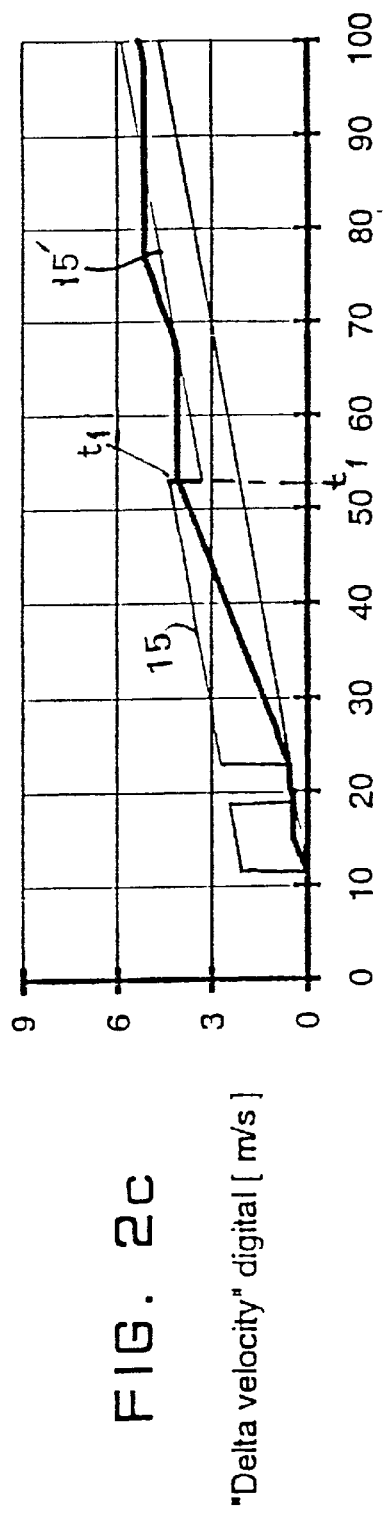
Figure 2D:
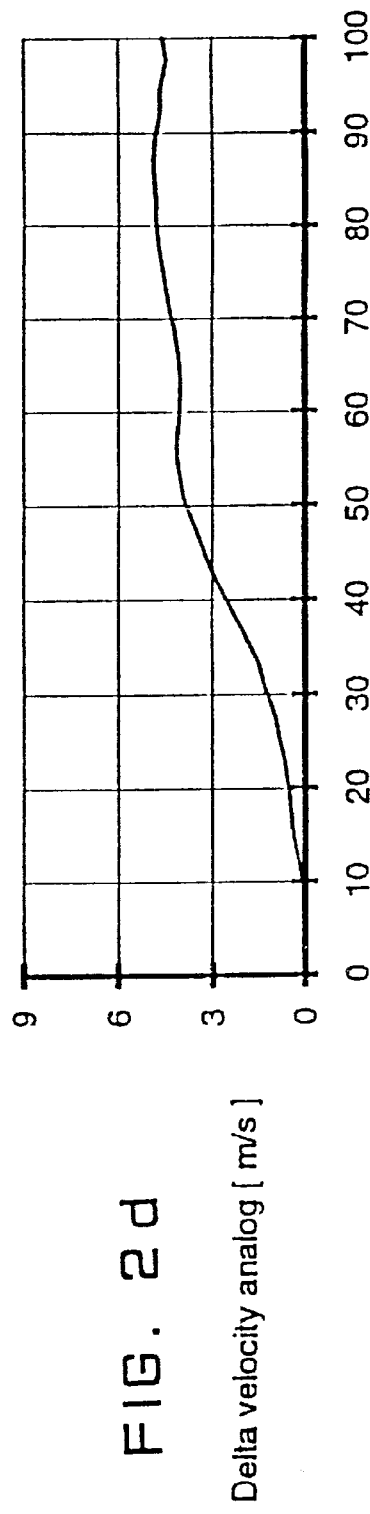
Figure 2E:
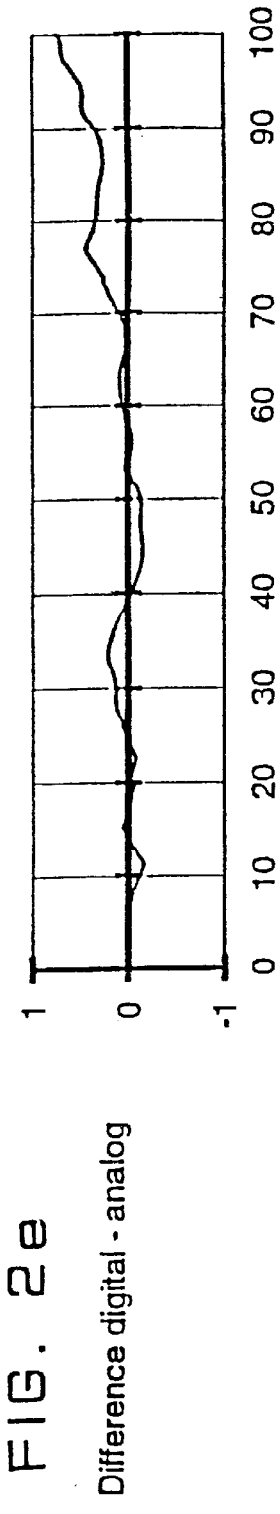

FIGS. 2 and 3 show the acceleration signals obtained and processed in the case of a collision of a vehicle against a rigid obstacle at a speed of 12 km/h.

FIG. 2a shows the undamped acceleration signals produced by the acceleration sensor 1, the horizontal axis indicating the time in milliseconds and the vertical axis indicating the acceleration g.

The graph in FIG. 2b shows the times during which the threshold value circuit 3 activates the counter 4. The activation in the example of FIG. 2b is only at the first threshold value stage because of the weakness of the signal.

The graph of FIG. 2c indicates the rise in the counted pulses as compared with the threshold value preset by the triggering threshold value circuit 6, and represented by the line 15. Because of the low power of the first signal section, the counter 4 is reset after approximately 8 ms, since its count would be negative at that time. The system is now completely reset to the original standby state and starts at approximately 23 ms to operate again because of the start threshold of 5 g having been exceeded again. At the time 23 ms plus t1, the triggering threshold in the decoder is switched over to a lower value 15' and the protective device could now be fired, even though the two other signals have exceeded their respective triggering thresholds.

FIG. 2d shows the signal, obtained by integration of speed reduction, $\delta v$, from the graph of FIG. 2a.

The differences in the case of analog/digital conversion will be apparent from the graphs of FIGS. 3a–3e. The time section of interest for sensing a collision is not large in the graphs of FIGS. 3a–3e.

The graph in FIG. 3a shows the acceleration signals, produced by the acceleration sensor 1, along the line 16 and the signals from the damped acceleration sensor 2 along the line 17.

The graph of FIG. 3b indicates the difference between the signals produced by the acceleration sensors 1 and 2. The graph in FIG. 3b also illustrates the waviness of the energy pattern of the measured acceleration. A difference signal is derived in the comparison circuit 7.

Figure 3C:
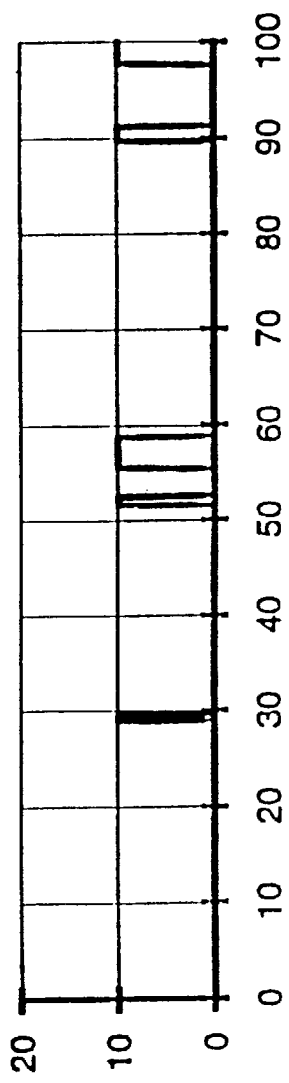

The graph of FIG. 3c illustrates that the threshold value has been reached by the threshold value circuit 8, which activates counter 9. Furthermore, the graph of FIG. 3d indicates the triggering threshold value of the threshold value circuit 10 in the form of the broken line 18.

Figure 3D:
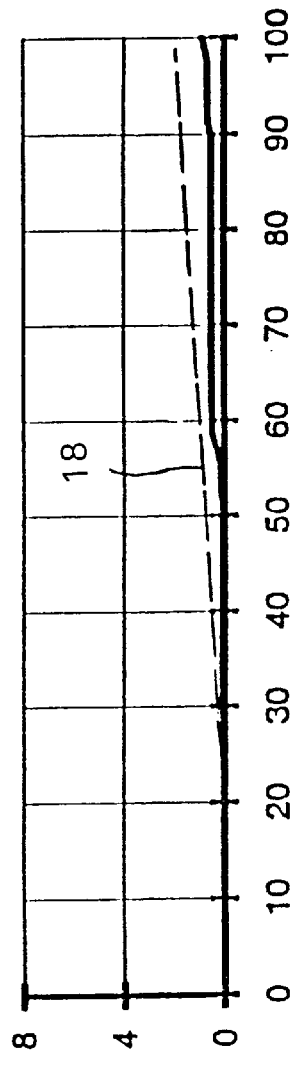
Figure 3E:
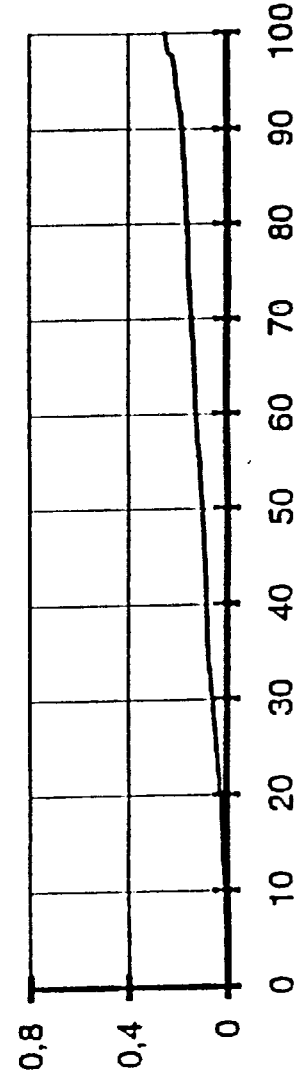

For a comparison with the digital energy pattern of FIG. 3d, FIG. 3e shows the analog energy pattern, which differs from the digitalized energy pattern only negligibly.

As will be seen from the graph of FIG. 3d, the curve of the energy pattern does not reach the triggering threshold value 18 so that in the case of a collision of a vehicle with speed of 12 km/h, there will be no triggering of the vehicle safety system, although on the basis of the evaluation of the speed change, $\delta v$, in accordance with FIG. 2c, the triggering threshold value is reached at the time t1.

Figure 4C:
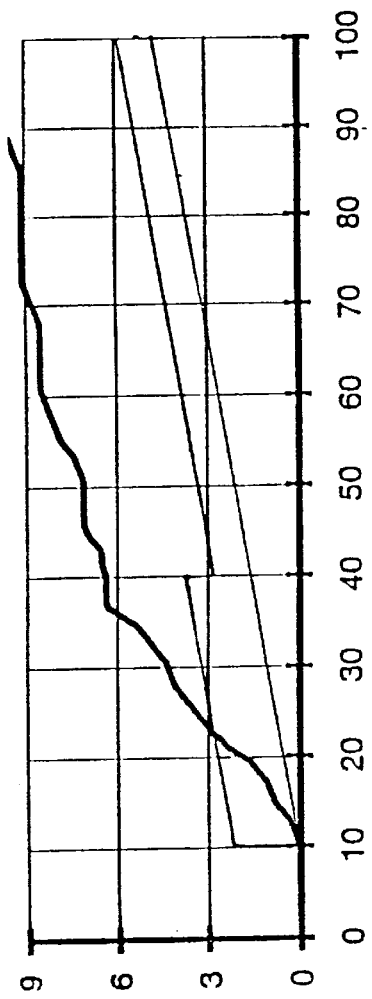
Figure 4D:
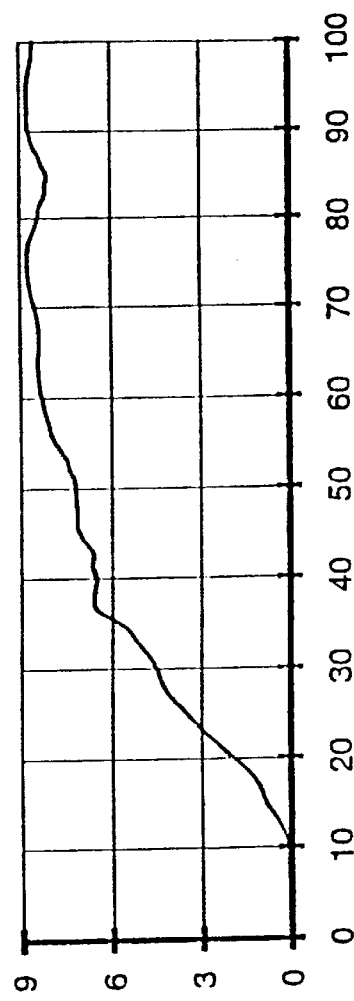
Figure 4E:
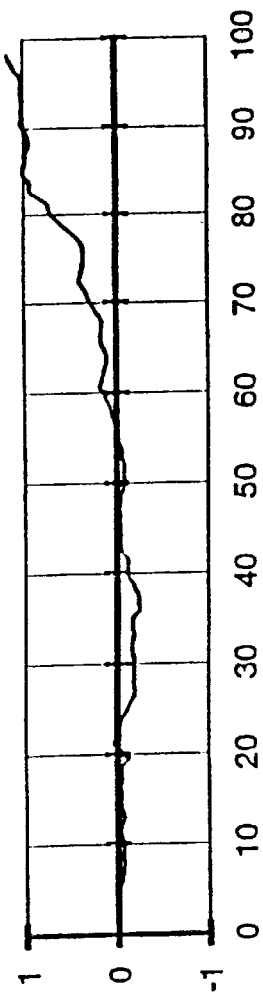
Figure 5C:
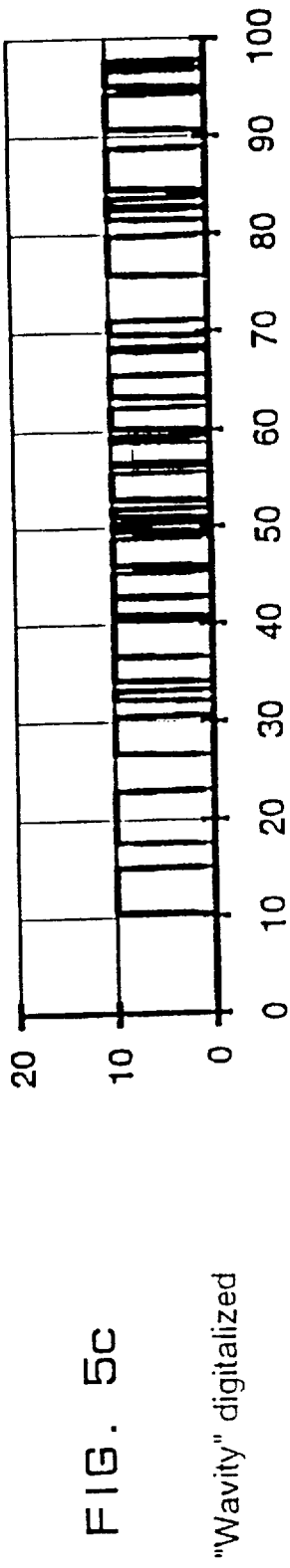
Figure 5D:
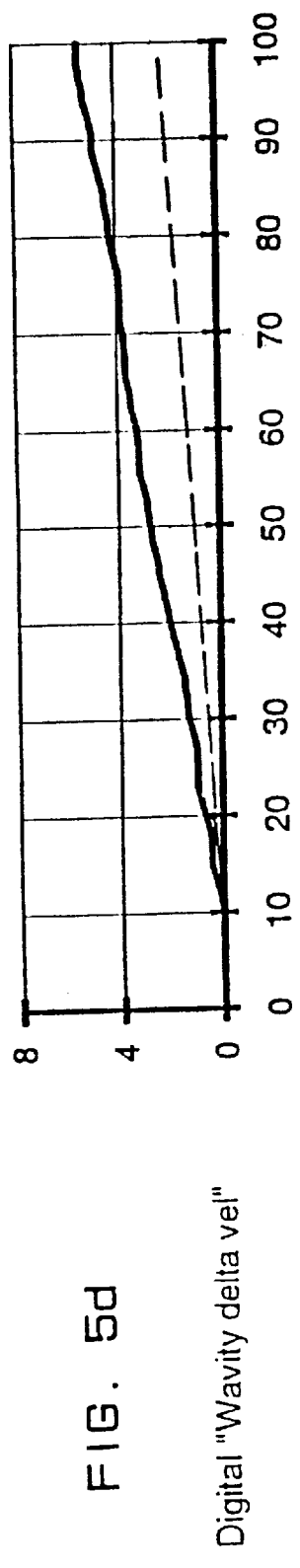
Figure 5E:
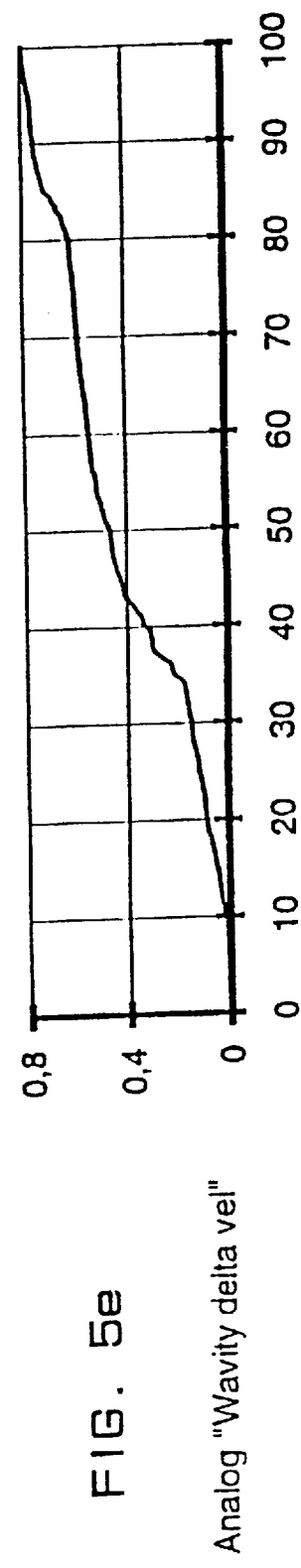
Figure 6C:
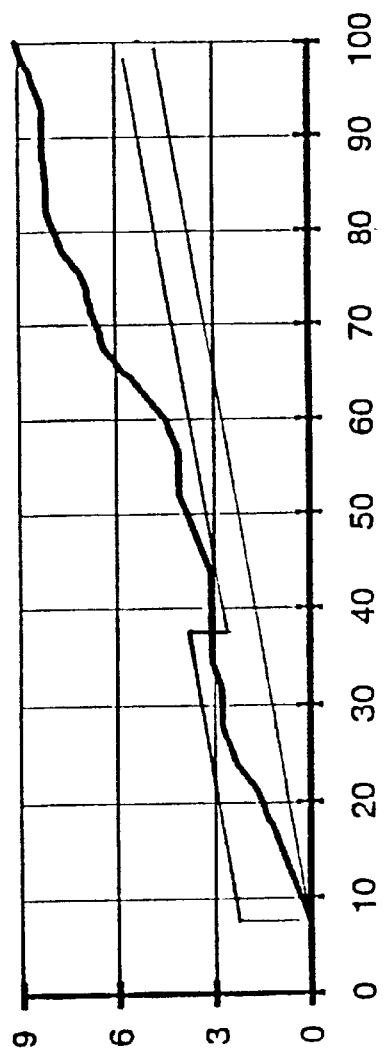
Figure 6D:
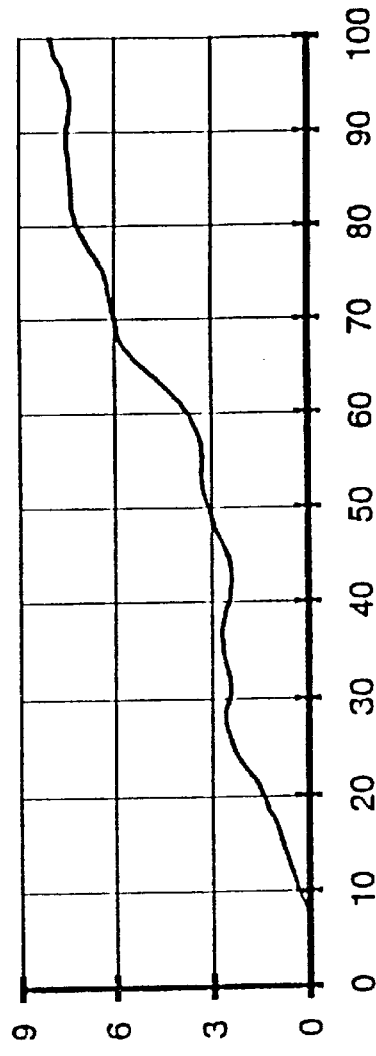
Figure 6E:
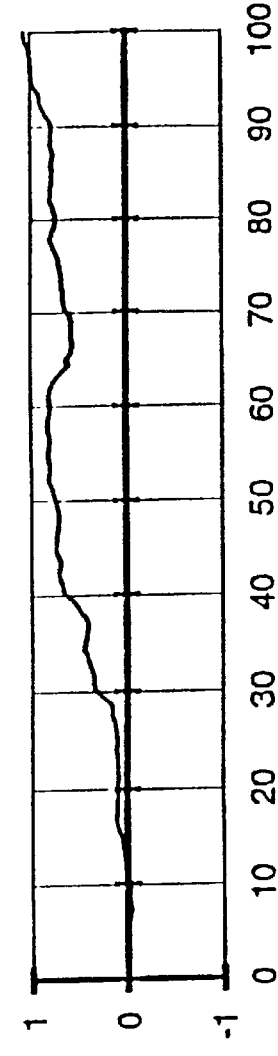
Figure 7A:
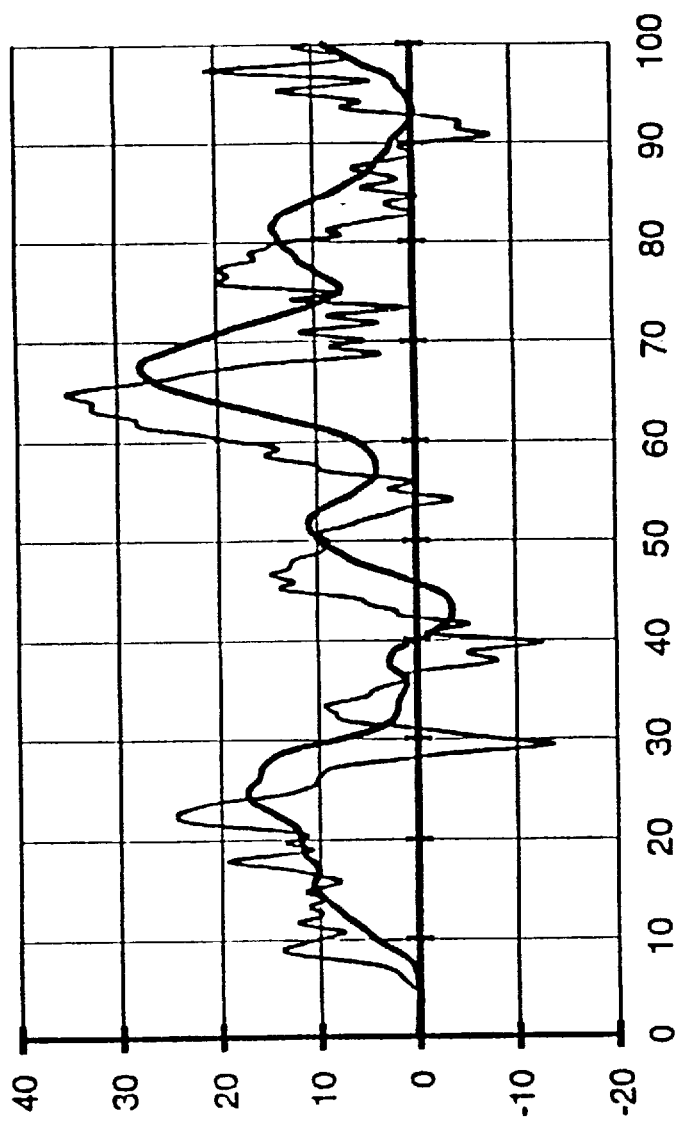
Figure 7B:
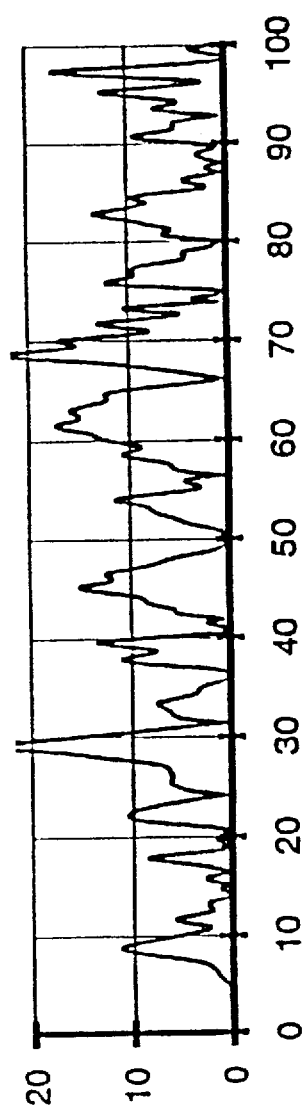
Figure 7C:
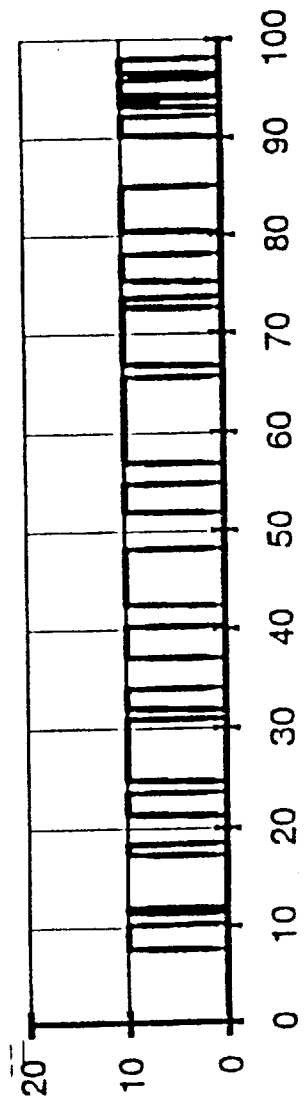
Figure 7D:
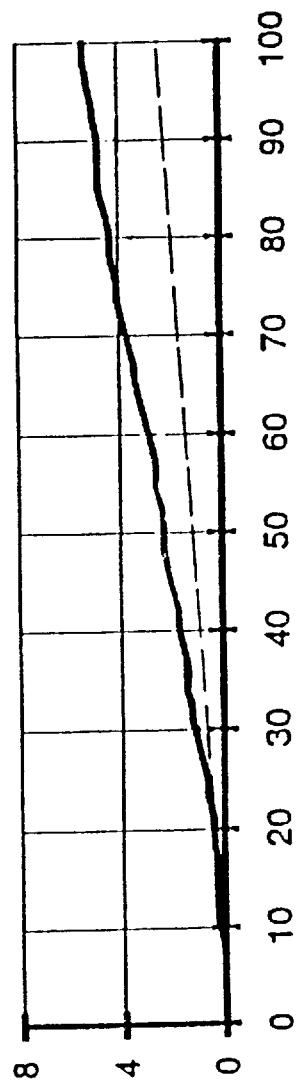
Figure 7E:
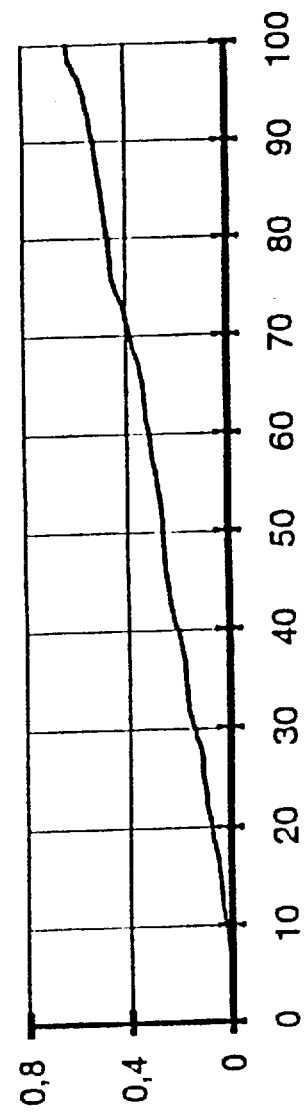

FIGS. 4 and 5 and further FIGS. 6 and 7 show the corresponding graphs for a collision at 12 km/h and 50 km/h. The graphs of FIGS. 4c and 5d and furthermore FIGS. 6c and 7d illustrate that for the evaluation of the speed changes and of the energy pattern, the triggering threshold values are respectively exceeded.

Figure 8:
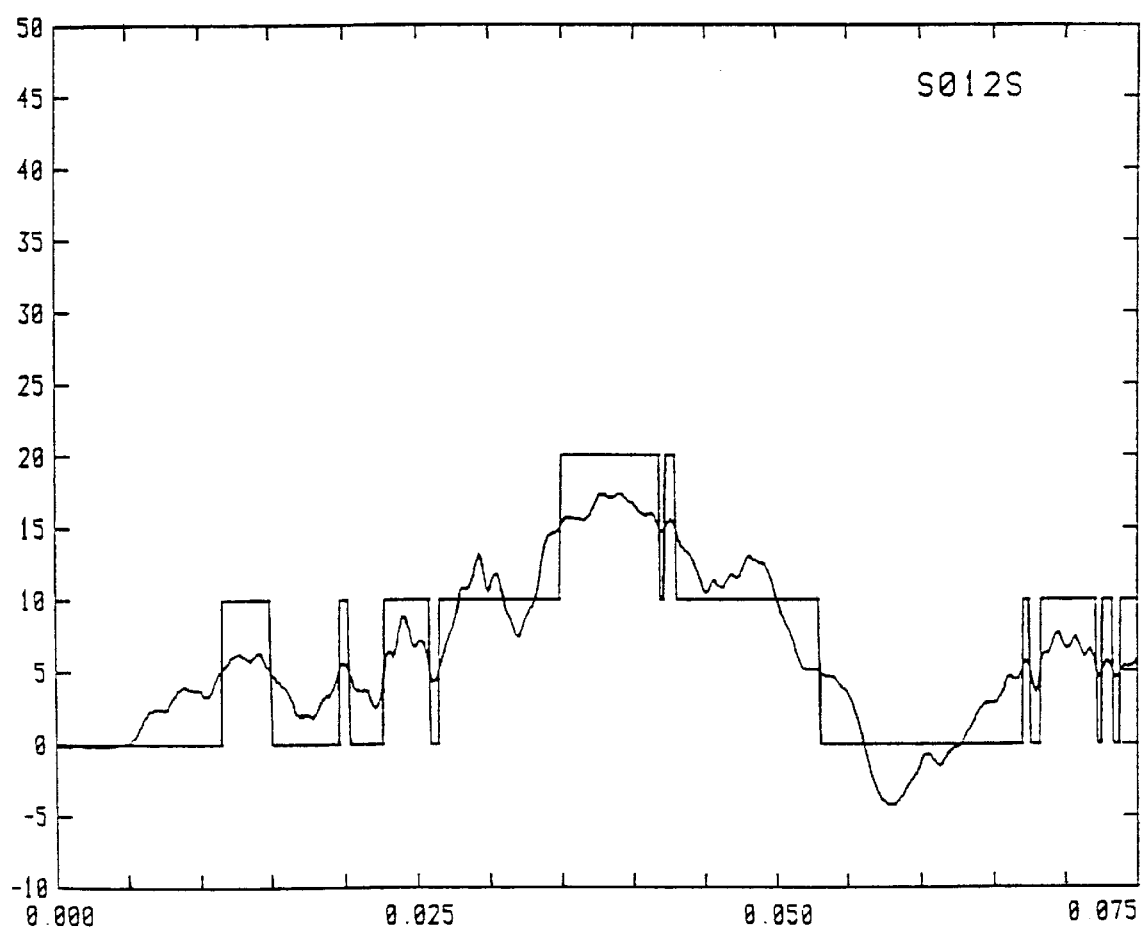
FIG. 8 is a graph illustrating the square wave signals produced by the threshold value circuit from the measured acceleration values in the case of a collision of a vehicle at 12 km/h with another setting of the comparator threshold values.
Figure 9:
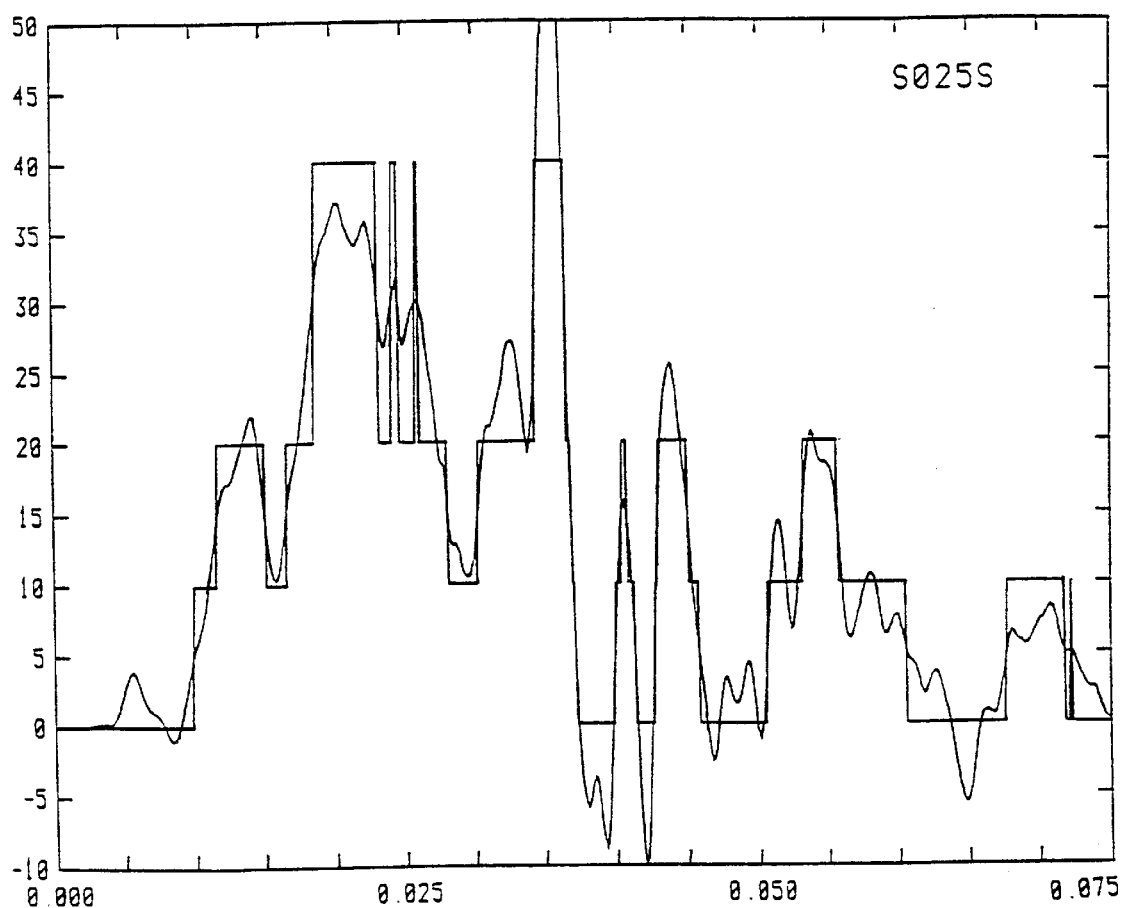
FIG. 9 is a graph similar to FIG. 8 illustrating a collision of a vehicle at 25 km/h.
Figure 10:
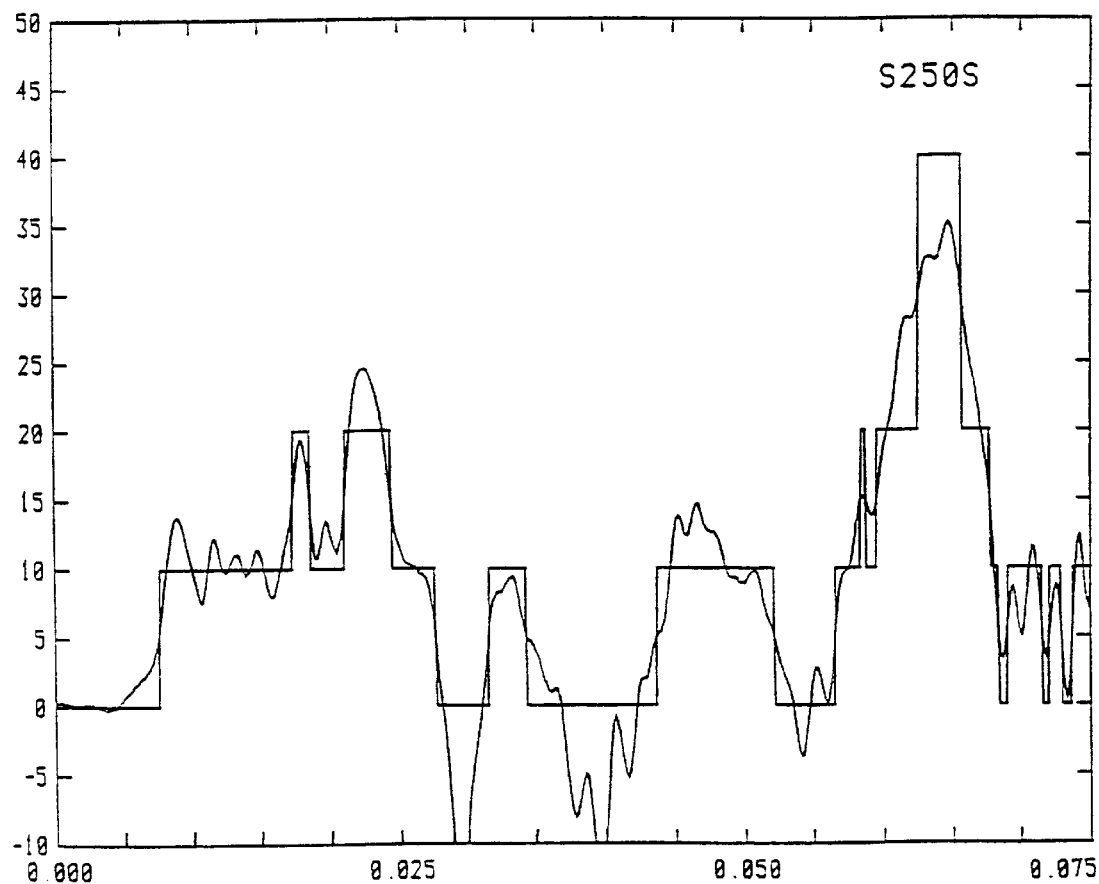
FIG. 10 is a graph similar to FIG. 8 illustrating a collision of a vehicle at a speed of 50 m/h.

For the three collisions with the speeds of 12, 25 and 50 km/h, FIGS. 8 through 10 respectively show the measured acceleration values in an analog form and in a form converted into square wave signals in the case of another comparator threshold value setting. Furthermore, the three threshold values, which activate the counter 4 with different weighting factors obtained by the comparison circuit 3, are also illustrated.

As shown in the block circuit diagram of FIG. 1, there are three different signal paths joined together via an AND gate. In this respect the triggering of the safety system, for example in the form of an air bag, only takes place:

(1) if the impact signal is evaluated on the basis of the speed reduction as being sufficiently heavy;

(2) if the waviness of the measured acceleration signal is larger than a critical threshold value; and (3) if the second independent damped sensor 2 detects a minimum degree of severity of the collision.

The triggering system is then based on the recognition or discovery that for prompt triggering of vehicle safety systems, such as air bags or belt pretensioners, it is not absolutely necessary to achieve a high degree of precision in signal processing. The protective effect is affected by other physical quantities such as seat position (distance from the steering wheel), and temperature (inflation time of air bag) more strongly than by electronic circuitry operating at the present day with an accuracy of milliseconds so that a reduction in precision of signal processing does not lead to a reduction in safety. For this reason, the triggering system in accordance with the invention requires less expensive components and if designed with CMOS components, also requires less power. Thus, complicated electronic circuitry may be avoided. Furthermore, it is possible to utilize cheaper acceleration sensors, which despite poor linearity and a smaller dynamic range, provide sufficiently reliable signals.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A triggering device for a vehicle safety system comprising:

a first acceleration sensor producing acceleration signals representing a measured acceleration;

a second acceleration sensor having a damping device for producing damped acceleration signals; and a signal processor which processes said acceleration signals output from at least one of said first and second acceleration sensors and which produces at least one triggering signal, said signal processor including:

a first threshold value circuit having at least a first vehicle-specific acceleration threshold value and a second vehicle-specific acceleration threshold value and being arranged to receive said acceleration signals;

a timer circuit for providing clock pulses;

a first counter having a first adjustable weighting factor, said first weighting factor being adjusted in correspondence with the acceleration threshold value selected by said first threshold value circuit and being greater when said first threshold value circuit selects said second acceleration threshold value than when said first threshold value circuit selects said first acceleration threshold value, said first counter being activated by said first threshold value circuit to produce a first count, said first counter adding the value of said first weighting factor at each clock pulse to said first count, said first counter decrementing said first count at each clock pulse by a value that is less than said first weighting factor corresponding to said first acceleration threshold value;

a first comparator which compares said first count to a first triggering threshold value and when said first triggering threshold value is reached or exceeded by said first count, outputs a triggering signal for triggering said vehicle safety system;

a second comparator which compares said acceleration signals from said first acceleration sensor and said damped acceleration signals from said second acceleration sensor and outputs a difference signal corresponding to a difference between said signals output by said first and said second acceleration sensors; and a second threshold value circuit for receiving said difference signal output from said second comparator, a second counter having a second weighting factor, said second counter being activated by said second threshold value circuit to produce a second count, said second counter adding the value of said second weighting factor to said second count at each clock pulse and also decrementing said second count by a value that is less than said second weighting factor at each clock pulse, and a third comparator which compares said second count with a second triggering threshold value and outputting a triggering signal when said second triggering threshold value is reached or exceeded, said second count being reset when said second count is negative.

2. The triggering device of claim 1, wherein said decrementing of said second count occurs in count steps, each of said count steps having a period of ½ n of the period of a clock pulse, n being a positive whole number.

3. The triggering device of claim 1, wherein said triggering signal for triggering said vehicle safety system is output only if both of said first and said second triggering threshold values are reached or exceeded.

4. A triggering device for a vehicle safety system comprising:

an acceleration sensor producing acceleration signals representing a measured acceleration;

an acceleration threshold determiner arranged to receive said acceleration signals and to determine whether said acceleration signals reach or exceed at least a first vehicle-specific acceleration threshold value and a second vehicle-specific acceleration threshold value;

a timer providing clock pulses;

a counter arranged to receive said clock pulses and being activated by said acceleration threshold determiner to produce a count, said counter incrementing said count by a first increment value for each clock pulse when said acceleration signal is below said first acceleration threshold value, said counter incrementing said count by a second increment value greater than said first increment value for each clock pulse when said acceleration signal is at or above said first acceleration threshold value but below said second acceleration threshold value, said counter incrementing said count by a third increment value greater than said second increment value for each clock pulse when said acceleration signal is at or above said second acceleration threshold value, and said counter decrementing said count by a decrement value less than said second increment value for each clock pulse; and a triggering threshold determiner comparing said count to a triggering threshold value and, when said triggering threshold value is reached or exceeded by said count, outputting a triggering signal triggering said vehicle safety system.

5. The triggering device for a vehicle safety system of claim 4, wherein said acceleration threshold determiner further comprises at least one comparator comparing said acceleration signals to said acceleration threshold values.

6. The triggering device for a vehicle safety system of claim 4, wherein said counter resets said count when said count has a negative value.

7. The triggering device for a vehicle safety system of claim 4, further comprising a device for changing said triggering threshold value after a period of time that is specific to a vehicle, said period of time beginning from said activation of said counter.

8. The triggering device for a vehicle safety system of claim 4, further comprising a device for changing said triggering threshold value in stages.

9. The triggering device for a vehicle safety system of claim 4, wherein said second increment value is twice the value of said first increment value, and said third increment value is twice the value of said second increment value.

10. The triggering device for a vehicle safety system of claim 4, wherein said decrement value is half the value of said second increment value.

11. The triggering device for a vehicle safety system of claim 4, wherein the acceleration threshold determiner further determines whether said acceleration signals reach or exceed a third vehicle-specific acceleration threshold value, said counter incrementing said count by said third increment value for each clock pulse when said acceleration signal is at or above said second acceleration threshold value but below said third acceleration threshold value, and said counter incrementing said counter by a fourth increment value for each clock pulse when said acceleration signal is at or above said third acceleration threshold value.

12. The triggering device for a vehicle safety system of claim 11, wherein said second increment value is twice the value of said first increment value, said third increment value is twice the value of said second increment value, and said fourth increment value is twice the value of said third increment value.

13. The triggering device for a vehicle safety system of claim 11, wherein said decrement value is half the value of said second increment value.

14. A triggering device for a vehicle safety system comprising:
an acceleration sensor producing acceleration signals representing a measured acceleration;
a first acceleration threshold determiner arranged to receive said acceleration signals and to determine whether said acceleration signals reach or exceed at least a first vehicle-specific acceleration threshold value and a second vehicle-specific acceleration threshold value;
a timer providing clock pulses;
a first counter arranged to receive said clock pulses and being activated by said first acceleration threshold determiner to produce a first count, said first counter incrementing said count by a first increment value for each clock pulse when said acceleration signal is at or above said first acceleration threshold value but below said second acceleration threshold value, said counter incrementing said count by a second increment value greater than said first increment value for each clock pulse when said acceleration signal is at or above said second acceleration threshold value; and
a first triggering threshold determiner comparing said first count to a first triggering threshold value and, when said first triggering threshold value is reached or exceeded by said first count, outputting a first triggering signal for triggering said vehicle safety system.

15. The triggering device for a vehicle safety system of claim 14, further comprising a comparator comparing said acceleration signals from said acceleration sensor and damped acceleration signals from a second acceleration sensor and outputting a difference signal corresponding to a difference between said signals output by said first and second acceleration sensors.

16. The triggering device for a vehicle safety system of claim 15, further comprising:
a second acceleration threshold determiner being arranged to receive said difference signal output by said comparator;
a second counter arranged to receive said clock pulses and being activated by said second acceleration threshold value determiner to produce a second count, said second counter decrementing said second count by a decrement value for each clock pulse; and
a second triggering threshold determiner comparing said second count to a second triggering threshold value and, when said second count reaches or becomes less than said second triggering threshold value, outputting a second triggering signal for triggering said vehicle safety system.

17. The triggering device for a vehicle safety system of claim 16, wherein said decrementing of said second count occurs in count steps, each of said count steps having a period of ½ n of the period of a clock pulse, n being a positive whole number.

18. The triggering device for a vehicle safety system of claim 16, wherein said vehicle safety system is triggered only if both of said first and said second triggering signals are output.

* * * * *